(12) United States Patent
Tian et al.

(10) Patent No.: US 9,248,583 B2
(45) Date of Patent: *Feb. 2, 2016

(54) ABRASIVE ARTICLE AND METHOD OF FORMING

(75) Inventors: Yinggang Tian, Shrewsbury, MA (US); Arup K. Khaund, Northborough, MA (US); Krishnamoorthy Subramanian, Lexington, MA (US); John Pearlman, Berlin, MA (US)

(73) Assignees: Saint-Gobain Abrasives, Inc., Worcester, MA (US); Saint-Gobain Abrasifs, Conflans-Sainte-Honorine (FR)

( * ) Notice: Subject to any disclaimer, the term of this patent is extended or adjusted under 35 U.S.C. 154(b) by 0 days.

This patent is subject to a terminal disclaimer.

(21) Appl. No.: 13/341,862

(22) Filed: Dec. 30, 2011

(65) Prior Publication Data
US 2012/0167482 A1 Jul. 5, 2012

Related U.S. Application Data

(60) Provisional application No. 61/428,308, filed on Dec. 30, 2010.

(51) Int. Cl.
| | |
|---|---|
| *B24D 3/02* | (2006.01) |
| *C09C 1/68* | (2006.01) |
| *C09K 3/14* | (2006.01) |
| *B28D 5/04* | (2006.01) |
| *B23D 61/18* | (2006.01) |
| *B23D 65/00* | (2006.01) |
| *B24B 27/06* | (2006.01) |
| *B24D 3/00* | (2006.01) |
| *B24D 3/06* | (2006.01) |
| *B24D 11/00* | (2006.01) |

(52) U.S. Cl.
CPC .............. *B28D 5/045* (2013.01); *B23D 61/185* (2013.01); *B23D 65/00* (2013.01); *B24B 27/0633* (2013.01); *B24D 3/002* (2013.01); *B24D 3/06* (2013.01); *B24D 11/00* (2013.01)

(58) Field of Classification Search
None
See application file for complete search history.

(56) References Cited

U.S. PATENT DOCUMENTS

| 2,764,543 A | 9/1956 | Comstock 3D et al. |
| 2,784,536 A | 3/1957 | Barron |
| 2,793,478 A | 5/1957 | Rohowetz |

(Continued)

FOREIGN PATENT DOCUMENTS

| CH | 599837 A5 | 5/1978 |
| CN | 1456410 A | 11/2003 |

(Continued)

OTHER PUBLICATIONS

PCT/US2011/068240 ISR & WO mailed Aug. 27, 2012, 9 pages.

(Continued)

*Primary Examiner* — Jun Li
*Assistant Examiner* — Ross J Christie
(74) *Attorney, Agent, or Firm* — Abel Law Group, LLP; Joseph P Sullivan

(57) ABSTRACT

An abrasive article may include a substrate, a tacking film overlying the substrate, abrasive particles that may include a coating layer bonded to the tacking film such that a bond between the coating layer and the tacking film defines a metallic bonding region, and a bonding layer overlying the abrasive particles and the tacking film.

19 Claims, 4 Drawing Sheets

(56) References Cited

U.S. PATENT DOCUMENTS

| | | |
|---|---|---|
| 3,150,470 A | 9/1964 | Barron |
| 3,178,273 A | 4/1965 | Libal |
| 3,854,898 A | 12/1974 | Whitney, Jr. et al. |
| 3,884,212 A | 5/1975 | Armstrong et al. |
| 3,894,673 A | 7/1975 | Lowder et al. |
| 3,906,684 A | 9/1975 | Marshall et al. |
| 3,997,302 A | 12/1976 | Supkis |
| 3,997,902 A | 12/1976 | Nard |
| 4,015,931 A | 4/1977 | Thankur |
| 4,018,576 A | 4/1977 | Lowder et al. |
| 4,055,700 A | 10/1977 | Ronnquist et al. |
| 4,187,828 A | 2/1980 | Schmid |
| 4,384,564 A | 5/1983 | Smith et al. |
| 4,485,757 A | 12/1984 | Ebner |
| 4,627,950 A | 12/1986 | Matsui et al. |
| 4,643,740 A | 2/1987 | Nicolson |
| 4,646,710 A | 3/1987 | Schmid et al. |
| 4,681,538 A | 7/1987 | DeLuca et al. |
| 4,684,052 A | 8/1987 | McDonald et al. |
| 4,727,852 A | 3/1988 | Schmid et al. |
| 4,776,862 A | 10/1988 | Wiand |
| 4,811,170 A | 3/1989 | Pammer |
| 4,866,888 A | 9/1989 | Murai et al. |
| 4,907,564 A | 3/1990 | Sowa et al. |
| 4,968,326 A | 11/1990 | Wiand |
| 4,974,373 A | 12/1990 | Kawashima et al. |
| 5,062,865 A | 11/1991 | Chen et al. |
| 5,127,197 A | 7/1992 | Brukvoort et al. |
| 5,127,924 A | 7/1992 | Russell |
| 5,213,591 A | 5/1993 | Celikkaya et al. |
| 5,218,949 A | 6/1993 | Tomlinson et al. |
| 5,250,084 A | 10/1993 | Lansell et al. |
| 5,251,802 A | 10/1993 | Bruxvoort et al. |
| 5,318,604 A | 6/1994 | Gorsuch et al. |
| 5,377,568 A | 1/1995 | Hauser |
| 5,377,659 A | 1/1995 | Tank et al. |
| 5,383,443 A | 1/1995 | Buyens |
| 5,438,973 A | 8/1995 | Schmid et al. |
| 5,454,750 A | 10/1995 | Schmid et al. |
| 5,492,771 A | 2/1996 | Lowder et al. |
| 5,496,386 A | 3/1996 | Broberg et al. |
| 5,511,718 A | 4/1996 | Lowder et al. |
| 5,544,643 A | 8/1996 | Bauer et al. |
| 5,571,296 A | 11/1996 | Barber, Jr. et al. |
| 5,578,098 A | 11/1996 | Gagliardi et al. |
| 5,616,065 A | 4/1997 | Egglhuber |
| 5,643,055 A | 7/1997 | Linzell |
| 5,660,320 A | 8/1997 | Hoffmuller et al. |
| 5,707,509 A | 1/1998 | Hartweg |
| 5,840,089 A | 11/1998 | Chesley et al. |
| 5,846,269 A | 12/1998 | Shiue et al. |
| 5,855,314 A | 1/1999 | Shiue et al. |
| 5,913,305 A | 6/1999 | Hauser |
| 5,924,917 A | 7/1999 | Benedict |
| 5,935,407 A | 8/1999 | Nenov et al. |
| 5,964,210 A | 10/1999 | Hodsden |
| 5,975,988 A | 11/1999 | Christianson |
| 6,056,794 A | 5/2000 | Stoetzel et al. |
| 6,065,462 A | 5/2000 | Hodsden et al. |
| 6,070,570 A | 6/2000 | Ueoka et al. |
| 6,102,024 A * | 8/2000 | Buljan et al. ............. 125/21 |
| 6,194,068 B1 | 2/2001 | Ohashi et al. |
| 6,194,086 B1 | 2/2001 | Nenov et al. |
| 6,228,133 B1 | 5/2001 | Thurber et al. |
| 6,279,564 B1 | 8/2001 | Hodsden |
| 6,286,498 B1 | 9/2001 | Sung |
| 6,311,684 B1 | 11/2001 | Hodsden et al. |
| 6,319,108 B1 | 11/2001 | Adefris et al. |
| 6,368,198 B1 | 4/2002 | Sung et al. |
| 6,463,921 B2 | 10/2002 | Shimazaki et al. |
| 6,613,113 B2 | 9/2003 | Minick et al. |
| 6,679,243 B2 * | 1/2004 | Sung ............. 51/297 |
| 6,755,720 B1 | 6/2004 | Ishizaki et al. |
| 6,783,442 B2 | 8/2004 | Lukschandel et al. |
| 6,790,126 B2 | 9/2004 | Wood et al. |
| 6,797,023 B2 | 9/2004 | Knapp et al. |
| 6,830,598 B1 | 12/2004 | Sung |
| 6,858,050 B2 | 2/2005 | Palmgren |
| 6,899,920 B2 | 5/2005 | Meyer |
| 6,915,796 B2 | 7/2005 | Sung |
| 6,939,413 B2 | 9/2005 | Crockett |
| 7,089,925 B1 | 8/2006 | Lin et al. |
| 7,124,753 B2 * | 10/2006 | Sung ............. 51/297 |
| 7,134,430 B2 | 11/2006 | Kim et al. |
| 7,261,752 B2 | 8/2007 | Sung |
| 7,306,508 B2 | 12/2007 | Kawasaki et al. |
| 7,435,276 B2 | 10/2008 | Chen et al. |
| 7,556,558 B2 | 7/2009 | Palmgren |
| 7,704,127 B2 | 4/2010 | Taniguchi et al. |
| 7,926,478 B2 | 4/2011 | Nakai et al. |
| 8,037,878 B2 | 10/2011 | Kitagawa et al. |
| 8,206,472 B2 | 6/2012 | Tani et al. |
| 8,257,572 B2 | 9/2012 | Castro et al. |
| 8,291,895 B2 | 10/2012 | Sudarshan et al. |
| 8,425,640 B2 | 4/2013 | Liebelt et al. |
| 8,677,986 B2 | 3/2014 | Kazahaya et al. |
| 8,707,944 B2 | 4/2014 | Morita et al. |
| 8,720,429 B2 | 5/2014 | Lange et al. |
| 8,802,602 B2 | 8/2014 | Schmitjes et al. |
| 2001/0025457 A1 | 10/2001 | Tselesin |
| 2002/0010068 A1 | 1/2002 | Komatsu |
| 2002/0077054 A1 * | 6/2002 | Sung ............. 451/540 |
| 2003/0084894 A1 * | 5/2003 | Sung ............. 125/12 |
| 2003/0121212 A1 | 7/2003 | Minick et al. |
| 2003/0134577 A1 | 7/2003 | Coad |
| 2003/0140914 A1 | 7/2003 | Lukschandel et al. |
| 2004/0107648 A1 | 6/2004 | Sung |
| 2004/0112359 A1 * | 6/2004 | Sung ............. 125/15 |
| 2004/0244789 A1 | 12/2004 | Jentgens |
| 2005/0018642 A1 | 1/2005 | Nakamura |
| 2005/0103320 A1 | 5/2005 | Ebner |
| 2006/0016127 A1 | 1/2006 | Sung |
| 2006/0083688 A1 | 4/2006 | Singaram et al. |
| 2006/0194038 A1 | 8/2006 | You et al. |
| 2006/0258268 A1 | 11/2006 | Miyata et al. |
| 2007/0023027 A1 | 2/2007 | Nakai et al. |
| 2007/0051354 A1 * | 3/2007 | Sung ............. 125/12 |
| 2007/0051355 A1 * | 3/2007 | Sung ............. 125/12 |
| 2007/0151388 A1 | 7/2007 | Yazawa et al. |
| 2007/0151554 A1 | 7/2007 | Song et al. |
| 2007/0261690 A1 | 11/2007 | Jentgens |
| 2007/0283944 A1 | 12/2007 | Hukin |
| 2008/0053000 A1 | 3/2008 | Palmgren et al. |
| 2008/0141593 A1 | 6/2008 | Bhatia |
| 2008/0141994 A1 | 6/2008 | Skovgaard-Soerensen et al. |
| 2008/0148650 A1 | 6/2008 | You |
| 2008/0206576 A1 | 8/2008 | Qian et al. |
| 2008/0212733 A1 | 9/2008 | Pop et al. |
| 2008/0261499 A1 | 10/2008 | Tani et al. |
| 2008/0271783 A1 | 11/2008 | Murakami et al. |
| 2009/0064983 A1 | 3/2009 | Sudarshan et al. |
| 2009/0120422 A1 | 5/2009 | Taniguchi |
| 2009/0202787 A1 | 8/2009 | Hall et al. |
| 2009/0242410 A1 | 10/2009 | Castro et al. |
| 2009/0283089 A1 * | 11/2009 | Sung ............. 51/309 |
| 2010/0197202 A1 | 8/2010 | Branagan et al. |
| 2011/0009039 A1 | 1/2011 | Balagani et al. |
| 2011/0039070 A1 | 2/2011 | Liebelt et al. |
| 2011/0045292 A1 | 2/2011 | Tian et al. |
| 2011/0263187 A1 | 10/2011 | Liu et al. |
| 2011/0308371 A1 | 12/2011 | Morita et al. |
| 2012/0037140 A1 | 2/2012 | Campos et al. |
| 2012/0055097 A1 | 3/2012 | Tian et al. |
| 2012/0167482 A1 * | 7/2012 | Tian et al. ............. 51/309 |
| 2012/0216787 A1 | 8/2012 | Morita et al. |
| 2013/0000211 A1 | 1/2013 | Upadhyay et al. |
| 2013/0032129 A1 | 2/2013 | Ontani et al. |
| 2013/0061535 A1 | 3/2013 | Tian et al. |
| 2013/0084786 A1 | 4/2013 | Rehrig et al. |
| 2013/0092143 A1 | 4/2013 | Sudarshan et al. |
| 2013/0205676 A1 | 8/2013 | Tian et al. |
| 2013/0219801 A1 | 8/2013 | Liebelt et al. |
| 2014/0007513 A1 | 1/2014 | Rehrig et al. |
| 2014/0011434 A1 | 1/2014 | Puzemis et al. |

(56) References Cited

U.S. PATENT DOCUMENTS

| | | |
|---|---|---|
| 2014/0013675 A1 | 1/2014 | Tian et al. |
| 2014/0017984 A1 | 1/2014 | Rehrig et al. |
| 2014/0017985 A1 | 1/2014 | Tian et al. |
| 2014/0150766 A1 | 6/2014 | Che et al. |
| 2014/0311472 A1 | 10/2014 | Tian et al. |

FOREIGN PATENT DOCUMENTS

| | | |
|---|---|---|
| CN | 1488480 A | 4/2004 |
| CN | 1583336 A | 2/2005 |
| CN | 1721113 A | 1/2006 |
| CN | 1739927 A | 3/2006 |
| CN | 101066614 A | 11/2007 |
| CN | 201283606 Y | 8/2009 |
| CN | 101564828 A | 10/2009 |
| CN | 101712135 A | 5/2010 |
| DE | 10-2004-043718 A1 | 3/2006 |
| EP | 0237784 | 6/1991 |
| EP | 916449 A1 | 5/1999 |
| EP | 1371438 | 12/2003 |
| EP | 1371438 A1 | 12/2003 |
| EP | 1475463 | 11/2004 |
| EP | 1685934 A1 | 8/2006 |
| EP | 2497602 A1 | 9/2012 |
| GB | 876605 A | 9/1961 |
| GB | 962357 A | 7/1964 |
| GB | 1254365 A | 11/1971 |
| GB | 1342359 A | 1/1974 |
| JP | 61-71949 | 4/1986 |
| JP | 63-102868 | 5/1988 |
| JP | 30-79264 | 4/1991 |
| JP | 3079264 A | 4/1991 |
| JP | 5016066 A | 1/1993 |
| JP | H07-096454 | 4/1995 |
| JP | H08-126953 | 5/1996 |
| JP | H09-150314 | 6/1997 |
| JP | H09-155631 | 6/1997 |
| JP | H09-254006 A | 9/1997 |
| JP | 10-034544 | 2/1998 |
| JP | 10118938 A | 5/1998 |
| JP | H10-118938 | 5/1998 |
| JP | 10-256581 | 9/1998 |
| JP | H10-328932 A | 12/1998 |
| JP | H11-216657 A | 8/1999 |
| JP | H11-216658 A | 8/1999 |
| JP | 11-277398 | 10/1999 |
| JP | 2957571 B1 | 10/1999 |
| JP | H11-320379 | 11/1999 |
| JP | H11-347911 | 12/1999 |
| JP | 2000-052226 | 2/2000 |
| JP | 2000-071160 | 3/2000 |
| JP | 2000-071162 | 3/2000 |
| JP | 2000-094297 | 4/2000 |
| JP | 2000-158318 | 6/2000 |
| JP | 2000-158319 | 6/2000 |
| JP | 2000-218504 | 8/2000 |
| JP | 2000-246542 | 9/2000 |
| JP | 2000-246654 A | 9/2000 |
| JP | 2000-263452 | 9/2000 |
| JP | 3-104553 B2 | 10/2000 |
| JP | 2000-271872 | 10/2000 |
| JP | 2000-288902 | 10/2000 |
| JP | 2001-054850 | 2/2001 |
| JP | 2001-105295 | 4/2001 |
| JP | 2001-113519 A | 4/2001 |
| JP | 2001-259993 A | 9/2001 |
| JP | 2001-277092 A | 10/2001 |
| JP | 2001-287146 A | 10/2001 |
| JP | 2001-341076 | 12/2001 |
| JP | 2002-172564 A | 6/2002 |
| JP | 2002-205272 | 7/2002 |
| JP | 2002205272 A | 7/2002 |
| JP | 2002-254286 A | 9/2002 |
| JP | 2002-254327 | 9/2002 |
| JP | 2002-273663 A | 9/2002 |
| JP | 2002-326151 A | 11/2002 |
| JP | 2002-331466 | 11/2002 |
| JP | 2002326151 | 11/2002 |
| JP | 2002-361566 A | 12/2002 |
| JP | 2003-231063 A | 8/2003 |
| JP | 2003525130 A | 8/2003 |
| JP | 2003-275970 A | 9/2003 |
| JP | 2003291057 A | 10/2003 |
| JP | 2004-009239 A | 1/2004 |
| JP | 2004-050318 | 2/2004 |
| JP | 31-03807 U | 6/2004 |
| JP | 2004-174680 | 6/2004 |
| JP | 2004174680 A | 6/2004 |
| JP | 2004-209573 A | 7/2004 |
| JP | 2004-216553 A | 8/2004 |
| JP | 2004-338023 A | 12/2004 |
| JP | 2005-007221 A | 1/2005 |
| JP | 2002-036091 A | 2/2005 |
| JP | 2005-238377 A | 9/2005 |
| JP | 2006-007387 A | 1/2006 |
| JP | 37-77285 B2 | 5/2006 |
| JP | 2006-123024 A | 5/2006 |
| JP | 2006123055 A | 5/2006 |
| JP | 2006130636 A | 5/2006 |
| JP | 2006-150505 A | 6/2006 |
| JP | 2006-179677 A | 7/2006 |
| JP | 2006-181701 A | 7/2006 |
| JP | 2006-231479 A | 9/2006 |
| JP | 2006-272499 A | 10/2006 |
| JP | 2007-021677 A | 2/2007 |
| JP | 2007-044870 A | 2/2007 |
| JP | 2007-061976 A | 3/2007 |
| JP | 2007-152485 | 6/2007 |
| JP | 2007-152486 | 6/2007 |
| JP | 2007152485 | 6/2007 |
| JP | 2007152485 A * | 6/2007 |
| JP | 2007-196312 A | 8/2007 |
| JP | 2007-196329 A | 8/2007 |
| JP | 2007-203393 A | 8/2007 |
| JP | 2007-203417 A | 8/2007 |
| JP | 2007-237628 A | 9/2007 |
| JP | 2007-253268 A | 10/2007 |
| JP | 2007-268627 A | 10/2007 |
| JP | 2007-281176 A | 10/2007 |
| JP | 2007-307261 A | 11/2007 |
| JP | 2008-068332 A | 3/2008 |
| JP | 2008-221406 A | 9/2008 |
| JP | 2009-066689 A | 4/2009 |
| JP | 2010-000583 A | 1/2010 |
| JP | 2010-000584 A | 1/2010 |
| JP | 2010-131698 A | 6/2010 |
| JP | 2010-284754 | 12/2010 |
| JP | 2011-016208 A | 1/2011 |
| JP | 2011-161613 | 8/2011 |
| KR | 2000-0033534 A | 6/2000 |
| KR | 2001-0055980 A | 7/2001 |
| KR | 10-2006-0006856 A | 1/2006 |
| RU | 2078680 C1 | 5/1997 |
| RU | 83210 | 5/2009 |
| TW | 442370 B | 6/2001 |
| TW | I291389 B | 12/2007 |
| WO | 98/05466 | 2/1998 |
| WO | 98/35784 A1 | 8/1998 |
| WO | 99/46077 | 9/1999 |
| WO | 9946077 A2 | 9/1999 |
| WO | WO 9946077 A2 * | 9/1999 ............ B23D 61/18 |
| WO | 00/61324 | 10/2000 |
| WO | 01/04227 A2 | 1/2001 |
| WO | 2004/069479 | 8/2004 |
| WO | 2005/064677 A1 | 7/2005 |
| WO | 2006070534 | 7/2006 |
| WO | 2006070534 A1 | 7/2006 |
| WO | 2006/083688 | 8/2006 |
| WO | 2007/039934 | 4/2007 |
| WO | 2008/000072 | 1/2008 |
| WO | 2009/064345 A2 | 5/2009 |
| WO | 2009-158507 A2 | 12/2009 |
| WO | 2010071198 | 6/2010 |

(56) References Cited

FOREIGN PATENT DOCUMENTS

| WO | 2010071198 | A1 | 6/2010 |
|---|---|---|---|
| WO | 2010/125083 | | 11/2010 |
| WO | 2010/125085 | A1 | 11/2010 |
| WO | 2011/020105 | A2 | 2/2011 |
| WO | 2011/020109 | A2 | 2/2011 |
| WO | 2011055692 | A1 | 5/2011 |
| WO | 2012/092614 | A2 | 7/2012 |
| WO | 2013/040423 | A2 | 3/2013 |
| WO | 2013/049204 | A2 | 4/2013 |
| WO | 2013/147892 | A1 | 10/2013 |
| WO | 2014/004982 | A1 | 1/2014 |
| WO | 2014/004991 | A1 | 1/2014 |
| WO | 2014/005009 | A1 | 1/2014 |
| WO | 2014/005015 | A1 | 1/2014 |
| WO | 2014/005028 | A1 | 1/2014 |
| WO | 2014/005037 | A1 | 1/2014 |
| WO | 2014172611 | A1 | 10/2014 |

OTHER PUBLICATIONS

International Search Report from PCT/US2012/031699 dated Nov. 16, 2012.
International Search Report for International Application No. PCT/JP2010/069294 dated Nov. 22, 2010.
International Search Report for PCT/US2013/048565 mailed Aug. 27, 2013.
International Search Report for PCT/US2013/048587 mailed Sep. 17, 2013.
International Search Report for PCT/US2013/048609 mailed Sep. 2, 2013.
International Search Report for PCT/US2013/048511 mailed Aug. 27, 2013.
International Search Report for PCT/US2013/048491 mailed Aug. 26, 2013.
Patel, Mitesh M., "Characterizing Fatigue and Fracture Response of Medical Grade Nickel—Titanium Alloys by Rotary Beam Testing," Presented at the ASTM Symposium on Fatigue and Fracture of Medical Metallic Materials and Devices, Dallas, Texas, Nov. 2005, 12 pages.
International Search Report for PCT/US2014/034611 mailed Aug. 28, 2014.
Copper and Copper Alloys Jan. 1, 2001 (exerpt)—Davis, ASM International; pp. 127-130.
International Search Report for PCT/US2011/068240 mailed Aug. 27, 2012.
Handbook of Thermoset Plastics, 2nd edition, p. 28, 1998.
International Search Report for PCT/US2010/045647 mailed Apr. 29, 2011.
U.S. Appl. No. 13/930,577, filed Jun. 28, 2013.
International Search Report for PCT/US2012/055529 mailed Feb. 21, 2013.
International Search Report for PCT/US2012/057334 mailed Mar. 28, 2013.
Higashi, Taisuke et al., Development of Low Melting Temperature Coating Materials for High Performance Diamonds Wire Saw: Effect of an Additive on Mechanical Properties.
Nakamura Choko Co., Ltd., "Company Report", Mar. 31, 2010, 10 pages.
International Search Report for PCT/US2013/048549 mailed Sep. 11, 2013.
Enomoto, Toshiyuki et al "Development of a Resinoid Diamond Wire Containing Metal Power for Slicing a Slicing Ingot." Annals of the CIRP. 32.1 (1983): 273-276.
Jun Sugawara et al., "Development of fixed abrasive-grain wire saw with less cutting loss" SEI Technical Review No. 58, Jun. 2004, pp. 7-11.
International Search Report for PCT/US2012/031699 mailed Nov. 16, 2012.
Daisuke Ide, "Resin Bond Diamond wire for slicing ceramics", Industrial Diamond Review vol. 2/2007, pp. 32-34.
Y. Chiba et al., "Development of a high-speed manufacturing method for electroplated diamond wire tools", Annals of the CIRP vol. 52/1/2003, pp. 281-284.
Osamu Kamiya et al., "Diamond and metal bonding by active solder for micro-cutting wire", Int. J. of Mdern Physics B, vol. 20, Nos. 25-27 (2006) pp. 3932-3937.
Fujisawa, M. et al. "Precision Sawing with Wire Saw." Annals of the CIRP. 32.1 (1983): 87-90.
Conversion US mesh (tamis)—microns: http://www.granuloshop.com/Conversion.htm (Sep. 2, 2003).
International Search Report for PCT/US2010/045643 mailed Apr. 29, 2011.

\* cited by examiner

ABRASIVE ARTICLE AND METHOD OF FORMING

CROSS-REFERENCE TO RELATED APPLICATION(S)

The present application claims priority from U.S. Provisional Patent Application No. 61/428,308, filed Dec. 30, 2010, entitled "Abrasive Article and Method of Forming," naming inventor Yinggang Tian, which application is incorporated by reference herein in its entirety.

BACKGROUND

1. Field of the Disclosure

The following is directed to methods of forming abrasive articles, and particularly, single-layered abrasive articles.

2. Description of the Related Art

A variety of abrasive tools have been developed over the past century for various industries for the general function of removing material from a workpiece, including for example, sawing, drilling, polishing, cleaning, carving, and grinding. In particular reference to the electronics industry, abrasive tools suitable for slicing single crystal ingots of material to form wafers is particularly pertinent. As the industry continues to mature, the ingots have increasingly larger diameters, and it has become acceptable to use loose abrasives and wire saws for such works due to yield, productivity, affected layers, dimensional constraints and other factors.

Generally, wire saws are abrasive tools that include abrasive particles attached to a long length of wire that can be spooled at high speeds to produce a cutting action. While circular saws are limited to a cutting depth of less than the radius of the blade, wire saws can have greater flexibility allowing for cutting of straight or profiled cutting paths.

Various approaches have been taken in conventional fixed abrasive wire saws, such as producing these articles by sliding steel beads over a metal wire or cable, wherein the beads are separated by spacers. These beads may be covered by abrasive particles which are commonly attached by either electroplating or sintering. However, electroplating and sintering operations can be time consuming and thus costly ventures, prohibiting rapid production of the wire saw abrasive tool. Most of these wire saws have been used in applications, where kerf loss is not so dominating as in electronics applications, often to cut stone or marble. Some attempts have been made to attach abrasive particles via chemical bonding processes, such as brazing, but such fabrication methods reduce the tensile strength of the wire saw, and the wire saw becomes susceptible to breaking and premature failure during cutting applications under high tension. Other wire saws may use a resin to bind the abrasives to the wire. Unfortunately, the resin bonded wire saws tend to wear quickly and the abrasives are lost well before the useful life of the particles is realized, especially when cutting through hard materials.

Accordingly, the industry continues to need improved abrasive tools, particularly in the realm of wire sawing.

SUMMARY

According to one aspect, an abrasive article includes a substrate, a tacking film overlying the substrate, abrasive particles comprising a coating layer overlying the abrasive particle bonded to the tacking film, wherein a bond between the coating layer and the tacking film defines a metallic bonding region, and a bonding layer overlying the abrasive particles and the tacking film.

According to another aspect, an abrasive article includes a substrate comprising an elongated body having an aspect ratio of length:width of at least about 10:1, a tacking film overlying the substrate comprising a solder material having a melting point of not greater than about 450° C., abrasive particles bonded to the tacking film, and a bonding layer overlying the abrasive particles and tacking film.

In yet another aspect, a method of forming an abrasive article includes providing a substrate, forming a tacking film overlying a surface of the substrate, the tacking film comprising a solder material, placing abrasive particles comprising a coating layer on the tacking film, and treating the tacking film to bind the coating layer and the tacking film to each other. The method further includes forming a bonding layer over the tacking film and the abrasive particles.

According to still another aspect, a method of forming an abrasive article includes providing a substrate comprising an elongated body having an aspect ratio of length:width of at least about 10:1, forming a tacking film comprising a metal overlying a surface of the substrate, the tacking film having melting point of not greater than about 450° C., placing abrasive particles in the tacking film, and forming a bonding layer over the tacking film and the abrasive particles.

Another aspect includes a method of forming an abrasive article including providing a substrate comprising a wire, forming a tacking film comprising a metal material overlying a surface of the substrate, placing abrasive particles in the tacking film, treating the tacking film to form a metallic bonding region between the abrasive particles and the tacking film, and forming a bonding layer over the tacking film and the abrasive particles

BRIEF DESCRIPTION OF THE DRAWINGS

The present disclosure may be better understood, and its numerous features and advantages made apparent to those skilled in the art by referencing the accompanying drawings.

The use of the same reference symbols in different drawings indicates similar or identical items.

DETAILED DESCRIPTION

The following is directed to abrasive articles, and particularly abrasive articles suitable for abrading and sawing through workpieces. In particular instances, the abrasive articles herein can form wire saws, which may be used in processing of sensitive, crystalline materials in the electronics industry, optics industry, and other associated industries.

Figure 1:
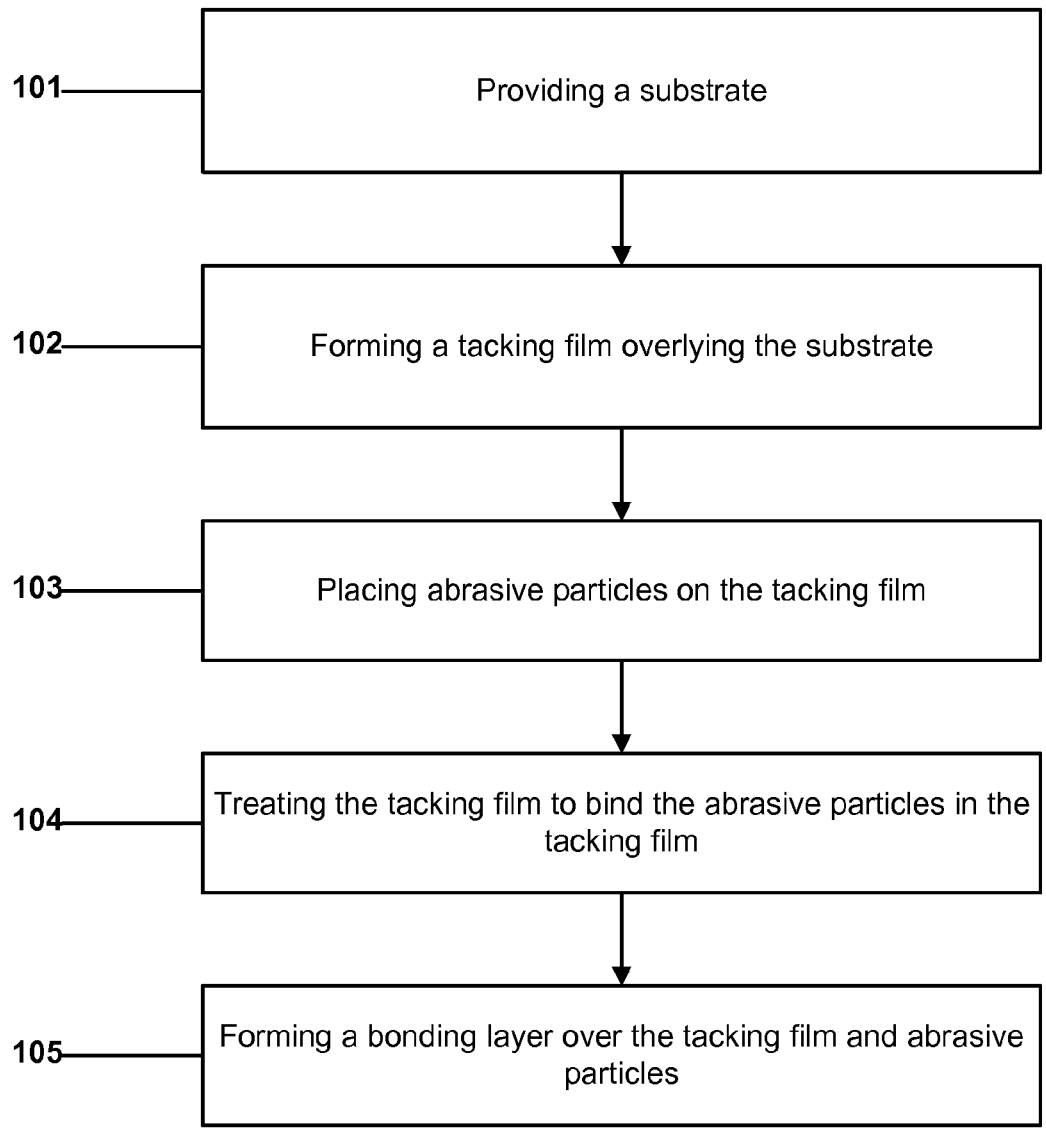
FIG. 1 includes a flow chart providing a process for forming an abrasive article in accordance with an embodiment.

FIG. 1 includes a flow chart providing a process of forming an abrasive article in accordance with an embodiment. The process can be initiated at step 101 by providing a substrate.

The substrate can provide a surface for affixing abrasive materials thereto, thus facilitating the abrasive capabilities of the abrasive article.

In accordance with an embodiment, the process of providing a substrate can include a process of providing a substrate in the form of a wire. In fact, the wire substrate may be connected to a spooling mechanism. For example, the wire can be fed between a feed spool and a receiving spool. The translation of the wire between the feed spool and the receiving spool can facilitate processing, wherein the wire is translated through desired forming processes to form the component layers of the finally-formed abrasive article while being translated from the feed spool to the receiving spool.

In accordance with an embodiment, the substrate can be an elongated member having an aspect ratio of length:width of at least 10:1. In other embodiments the substrate can have an aspect ratio of at least about 100:1, such as at least 1000:1, or even at least about 10,000:1. The length of the substrate is the longest dimension measured along a longitudinal axis of the substrate. The width is a second longest (or in some cases smallest) dimension of the substrate measured perpendicular to the longitudinal axis.

Furthermore, the substrate in the form of elongated member can have a length of at least about 50 meters. In fact, other substrates can be longer, having an average length of at least about 100 meters, such as at least about 500 meters, at least about 1,000 meters, or even 10,000 meters.

Furthermore, the substrate can have a width that may not be greater than about 1 cm. In fact, the substrate can be an elongated member having an average width of not greater than about 0.5 cm, such as not greater than about 1 mm, not greater than about 0.8 mm, or even not greater than about 0.5 mm. Still, the substrate can have an average width of at least about 0.01 mm, such as at least about 0.03 mm. It will be appreciated that the substrate can have an average width within a range between any of the minimum and maximum values noted above. Moreover, in the case that a substrate is a wire having a generally circular cross-sectional shape, it will be appreciated that reference to width is reference to a diameter.

In accordance with an embodiment, the substrate can include an inorganic material, such as a metal or metal alloy material. Some substrates can include a transition metal element as recognized in the Periodic Table of Elements. For example, the substrate may incorporate elements of iron, nickel, cobalt, copper, chromium, molybdenum, vanadium, tantalum, tungsten, and the like. In accordance with a particular embodiment, the substrate can include iron, and more particularly maybe steel.

In certain embodiments, the substrate can be an elongated member, such as a wire, that may include a plurality of filaments braided together. That is, the substrate can be formed of many smaller wires wound around each other, braided together, or fixed to another object, such as a central core wire. Certain designs may utilize piano wire as a suitable structure for the substrate.

In further reference to the process of providing a substrate, it will be appreciated that the substrate can be spooled from a feed spool to a receiving spool at a particular rate to facilitate processing. For example, the substrate can be spooled at a rate of not less than about 5 m/min from the feed spool to the receiving spool. In other embodiments, the rate of spooling can be greater, such that it is at least about 8 m/min, at least about 10 m/min, at least about 12 m/min, or even at least about 14 m/min. In particular instances, the spooling rate may be not greater than about 200 m/min, such as not greater than about 100 m/min. The rate of spooling can be within a range between any of the minimum and maximum values noted above. It will be appreciated the spooling rate can represent the rate at which the finally-formed abrasive article can be formed.

After providing a substrate at step 101, the process can continue at step 102 by forming a tacking film overlying a surface of the substrate. The process of forming a tacking film can include a deposition process, including for example, spraying, printing, dipping, die coating, plating, electroplating and a combination thereof. The tacking film can be bonded directly to the external surface of the substrate. In fact, the tacking film can be formed such that it overlies a majority of the external surface of the substrate, and more particularly, can overlie essentially the entire external surface of the substrate.

The tacking film may be formed such that it is bonded to the substrate in a manner that it defines a bonding region. The bonding region can be defined by an interdiffusion of elements between the tacking film and the substrate. It will be appreciated that formation of the bonding region may not necessarily be formed at the moment when the tacking film is deposited on the surface of the substrate. For example, the formation of a bonding region between the tacking film and the substrate may be formed at a later time during processing, such as during a heat treatment process to facilitate bonding between the substrate and other component layers formed on the substrate.

In accordance with an embodiment, the tacking film can be formed from a metal, metal alloy, metal matrix composite, and a combination thereof. In one particular embodiment, the tacking film can be formed of a material including a transition metal element. For example, the tacking film can be a metal alloy including a transition metal element. Some suitable transition metal elements can include, for example, lead, silver, copper, zinc, tin, titanium, molybdenum, chromium, iron, manganese, cobalt, niobium, tantalum, tungsten, palladium, platinum, gold, ruthenium, and a combination thereof. According to one particular embodiment, the tacking film can be made of a metal alloy including tin and lead, such as a 60/40 tin/lead composition. In another embodiment the tacking film can be made of a material having a majority content of tin. In fact, in certain abrasive articles, the tacking film comprises a material consisting essentially of tin.

The tin can have a purity of at least about 99%. Further, the tin can have a purity of at least about 99.1%, at least about 99.2%, at least about 99.3%, at least about 99.4%, at least about 99.5%, at least about 99.6%, at least about 99.7%, at least about 99.8%, or at least about 99.9%. In another aspect, the tin can have a purity of at least bout 100%.

In accordance with an embodiment, the tacking film can be a solder material. It will be appreciated that a solder material includes a material having a particular melting point, such as not greater than about 450° C. Solder materials are distinct from braze materials in that the braze materials generally have significantly higher melting points than solder materials, such as greater than 450° C., and more typically, greater than 500° C. Furthermore, brazing materials may have different compositions. Still, in accordance with an embodiment, the tacking film of the embodiments herein may be formed of a material having a melting point of not greater than about 400° C., such as not greater than about 375° C., not greater than about 350° C., not greater than about 300° C., or not greater than about 250° C. Still, the tacking film may have a melting point of at least about 100° C., such as at least about 125° C., at least about 150° C., or even at least about 175° C. It will be appreciated that the tacking film can have a melting point within a range between any of the minimum and maximum temperatures noted above.

Formation of the tacking film can include formation of additional layers overlying the tacking film. For example, in one embodiment, the formation of the tacking film includes formation of an additional layer overlying the tacking film to facilitate further processing. The overlying film can be a flux material, which facilitates melting of the material of the tacking film and further facilitates attachment of abrasive particles on the tacking film. The flux material can be in the form of a generally uniform layer overlying the tacking film, and more particularly in direct contact with the tacking film. The flux material can be in the form of a liquid or paste. According to one embodiment, the flux material can be applied to the tacking film using a deposition process such as spraying, dipping, painting, printing, brushing, and a combination thereof.

The additional layer in the form of a flux material can comprise a majority content of flux material. In certain instances, essentially all of the additional layer can consist of the flux material.

After forming the tacking film at step 102, the process can continue at step 103 by placing the abrasive particles on the tacking film. In some instances, depending upon the nature of the process, the abrasive particles can be in direct contact with the tacking film. More particularly, the abrasive particles can be in direct contact with an additional layer, such as a layer comprising a flux material, overlying the tacking film. In fact, the additional layer of material comprising the flux material can have a natural viscosity and adhesive characteristic that facilitates holding the abrasive particles in place during processing, until further processes are conducted to permanently bond the abrasive particles in place relative to the tacking film.

Suitable methods of providing the abrasive particles on the tacking film, and more particularly, on the additional layer comprising the flux material, can include spraying, gravity coating, dipping, die coating, electrostatic coating, and a combination thereof. Particularly useful methods of applying the abrasive particles can include a spraying process, conducted to apply an substantially uniform coating of abrasive particles onto the additional layer comprising the flux material.

In an alternative embodiment, the process of providing the abrasive particles can include the formation of a mixture comprising a flux material and the abrasive particles. The mixture can be formed and deposited directly on the tacking film, as opposed to utilizing a two-step process of first coating with a tacking film and then applying the abrasive particles. Mixing the abrasive particles with the flux and then applying that mixture to the wire can allow relatively high concentrations of single layers of abrasive particles per unit of wire to be achieved. For example, a wire saw having up to and including 600 abrasive particles per millimeter of wire can be made using this process. The abrasive particles can be disposed on the wire in substantially a single layer with agglomeration of abrasive particles or multiple layers of abrasive particles.

The abrasive particles can include materials such as oxides, carbides, nitrides, borides, oxynitrides, oxyborides, diamond, and a combination thereof. In certain embodiments, the abrasive particles can incorporate a superabrasive material. For example, one suitable superabrasive material includes diamond. In particular instances, the abrasive particles can consist essentially of diamond.

In one embodiment, the abrasive particles can include a material having a Vickers hardness of at least about 10 GPa. In other instances, the abrasive particles can have a Vickers hardness of at least about 25 GPa, such as at least about 30 GPa, at least about 40 GPa, at least about 50 GPa, or even at least about 75 GPa. Still, abrasive particles for use in the embodiments herein can have a Vickers hardness that is not greater than about 200 GPa, such as not greater than about 150 GPa, or even not greater than about 100 GPa. It will be appreciated that the abrasive particles can have a Vickers hardness within a range between any of the minimum and maximum values noted above.

The abrasive particles can have an average particle size that is determined in part by the desired end use of the abrasive article. In certain instances, the abrasive particles can have an average size that is not greater than about 500 microns. In other instances, the average particle size of the abrasive particles can be smaller, such that the average particle size is not greater than about 300 microns, not greater than about 250 microns, not greater than about 200 microns, not greater than about 150 microns, or even not greater than about 100 microns. In accordance with an embodiment, the average particle size of the abrasive particles can be at least about 0.1 microns, such as at least about 0.5 microns, or even at least about 1 micron. It will be appreciated that the abrasive particles can have an average particle size within a range between any of the minimum and maximum values noted above.

The abrasive particles may include a coating layer over the exterior surfaces of the abrasive particles. Suitable coating layer materials can include metal or metal alloy materials. In accordance with one particular embodiment, the coating layer can include a transition metal element, such as titanium, vanadium, chromium, molybdenum, iron, cobalt, nickel, copper, silver, zinc, manganese, tantalum, tungsten, and a combination thereof. Certain coating layers can include nickel, such as a nickel alloy, and even alloys have a majority content of nickel, as measured in weight percent as compared to other species present within the coating layer composition. In more particular instances, the coating layer can include a single metal species. For example, the coating layer can consist essentially of nickel.

The abrasive particles can be formed such that the coating layer can overly at least about 50% of the exterior surface area of the abrasive particle. In other embodiments, the coverage of the coating layer for each abrasive particle can be greater, such that the coating layer overlies at least about 75%, at least about 80%, at least about 90%, at least about 95%, or essentially the entire exterior surface of the abrasive particle.

After placing the abrasive particles on the tacking film at step 103, the process can continue at step 104 by treating the tacking film to bind the abrasive particles in the tacking film. Treating may include processes such as heating, curing, drying, and a combination thereof. In one particular embodiment, treating includes a thermal process, such as heating the tacking film to a temperature sufficient to induce melting of the tacking film, while avoiding excessive temperatures to limit damage to the abrasive particles and substrate. For example, treating can include heating the substrate, tacking film, and abrasive particles to a temperature of not greater than about 450° C. Notably, the process of treating can be conducted at a treating temperature that is less, such as not greater than about 375° C., not greater than about 350° C., not greater than about 300° C., or even not greater than about 250° C. In other embodiments, the process of treating can include heating the tacking film to a melting point of at least about 100° C., at least about 150° C., or even at least about 175° C.

It will be appreciated that the heating process can facilitate melting of materials within the tacking film and additional layers comprising the flux material to bond the abrasive particles to the tacking film and the substrate. The heating process can facilitate the formation of a particular bond between the abrasive particle and the tacking film. Notably, in the context of coated abrasive particles, a metallic bonding region can be formed between the coating material of the abrasive particles and the tacking film material. The metallic bonding region can be characterized by diffusion bond region having an interdiffusion between at least one chemical species of the tacking film and at least one species of the coating layer overlying the abrasive particles, such that the metallic bonding region comprises a mixture of chemical species from the two component layers.

After treating the tacking film at step 104, the process can continue at step 105, by forming a bonding layer over the tacking film and abrasive particles. Formation of the bonding layer can facilitate formation of an abrasive article having improved wear resistance. Furthermore, the bonding layer can enhance abrasive particle retention for the abrasive article. In accordance with an embodiment, the process of forming the bonding layer can include deposition of the bonding layer on the external surface of the article defined by the abrasive particles and the tacking film. In fact, the bonding layer can be bonded directly to the abrasive particles and the tacking film.

The formation of the bonding layer can include processes such as plating, spraying, dipping, printing, and a combination thereof. In accordance with one particular embodiment, the bonding layer can be formed by a plating process. Notably, formation of the bonding layer can include a multi-step process wherein the substrate with tacked abrasive particles from step 104 can be first cleaned or rinsed prior to formation of the bonding layer to remove unwanted materials (e.g., residual flux material from the additional layer).

The bonding layer can be formed such that it overlies at least 90% of the exposed surfaces of the abrasive particles and tacking film. In other embodiments, the coverage of the bonding layer can be greater, such that it overlies at least about 92%, at least about 95%, or even at least about 97% of the exposed surfaces of the abrasive particles and tacking film. In one particular embodiment, the bonding layer can be formed such that it overlies essentially all the exposed surfaces of the abrasive particles and tacking film and completely covers the component layers and defines the exterior surface of the abrasive article.

The bonding layer can be made of a material such as an organic material, inorganic material, and a combination thereof. Some suitable organic materials can include polymers such as UV curable polymer, thermosets, thermoplastics, and a combination thereof. Some other suitable polymer materials can include urethanes, epoxies, polyimides, polyamides, acrylates, polyvinyls, and a combination thereof.

Suitable inorganic materials for use in the bonding layer can include metals, metal alloys, cermets, ceramics, composites, and a combination thereof. In one particular instance, the bonding layer can be formed of a material having at least one transition metal element, and more particularly a metal alloy containing a transition metal element. Some suitable transition metal elements for use in the bonding layer can include lead, silver, copper, zinc, tin, titanium, molybdenum, chromium, iron, manganese, cobalt, niobium, tantalum, tungsten, palladium, platinum, gold, ruthenium, and a combination thereof. In certain instances, the bonding layer can include nickel, and may be a metal alloy comprising nickel, or even a nickel-based alloy. In still other embodiments, the bonding layer can consist essentially of nickel.

In accordance with one embodiment, the bonding layer can be made of a material, including for example composite materials, having a hardness that is greater than a hardness of the tacking film. For example, the bonding layer can have a Vickers hardness that is at least about 5% harder than a Vickers hardness of the tacking film. In fact, in other embodiments, the Vickers hardness of the bonding layer can be at least about 10%, such as at least about 20%, at least about 30%, at least about 40%, at least about 50%, at least about 75%, or even at least about 100% harder as compared to a Vickers hardness of the tacking film.

Additionally, the bonding layer can have a fracture toughness (K1c) as measured by indentation methods, that is at least about 5% greater than an average fracture toughness of the tacking film. In particular embodiment, the bonding layer can have a fracture toughness (K1c) that is at least about 8% greater, at least about 10% greater, at least about 15% greater, at least about 20% greater, at least about 25% greater, at least about 30% greater, or even at least about 40% greater than a fracture toughness of the tacking film.

Optionally, the bonding layer can include a filler material. The filler can be various materials suitable for enhancing performance properties of the finally-formed abrasive article. Some suitable filler materials can include abrasive particles, pore-formers such as hollow sphere, glass spheres, bubble alumina, natural materials such as shells and/or fibers, metal particles, and a combination thereof.

In one particular embodiment, the bonding layer can include a filler in the form of abrasive particles. The abrasive particles of the filler can be significantly different than the abrasive particles, particularly with regard to size, such that in certain instances the abrasive grain filler can have an average grain size that is substantially less than the average size of the abrasive particles bonded to the tacking film. For example, the abrasive grain filler can have an average grain size that is at least about 2 times less than the average particle size of the abrasive particles. In fact, the abrasive filler may have an average grain size that is even smaller, such as on the order of at least 3 times less, such as at least about 5 times less, at least about 10 times less, and particularly within a range between about 2 times and about 10 times less than the average particle size of the abrasive particles placed in the tacking film.

The abrasive grain filler within the bonding layer can be made from a material such as carbides, carbon-based materials (e.g. fullerenes), borides, nitrides, oxides, oxynitrides, oxyborides, and a combination thereof. In particular instances, the abrasive grain filler can be a superabrasive material such as diamond, cubic boron nitride, or a combination thereof. It will be appreciated that the abrasive grain filler can be the same material as that of the abrasive particles bonded to the tacking film. In other instances, the abrasive grain filler can include a different material than the material of the abrasive particles bonded to the tacking film.

Figure 2:
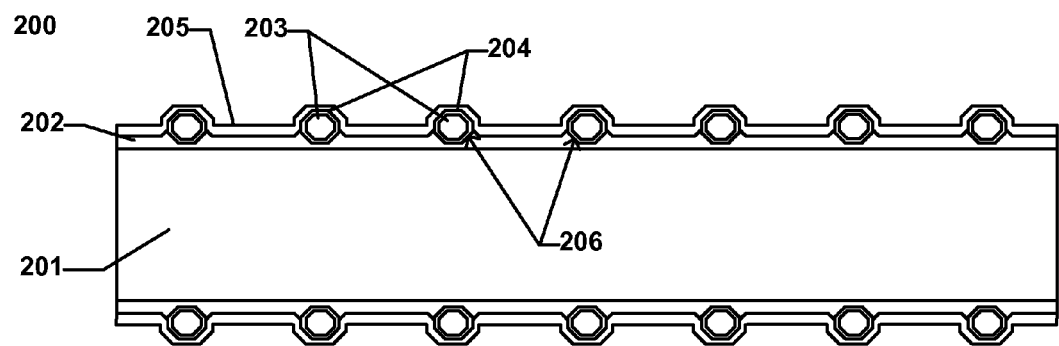
FIG. 2 includes a cross-sectional illustration of a portion of an abrasive article in accordance with an embodiment.

FIG. 2 includes a cross-sectional illustration of a portion of an abrasive article in accordance with an embodiment. As illustrated, the abrasive article 200 can include a substrate 201, which is in the form of an elongated member such as a wire. As further illustrated, the abrasive article can include a tacking film 202 disposed over the entire external surface of the substrate 201. Furthermore, the abrasive article 200 can include abrasive particles 203 including a coating layer 204 overlying the abrasive particles 203. The abrasive particles 203 can be bonded to the tacking film 202. In particular, the abrasive particles 203 can be bonded to the tacking film 202 at the interface 206, wherein a metallic bonding region can be formed as described herein.

The abrasive article 200 can include a coating layer 204 overlying the external surfaces of the abrasive particles 203. Notably, the coating layer 204 can be in direct contact with the tacking film 202. As described herein, the abrasive particles 203, and more particularly, the coating layer 204 of the abrasive particles 203, can form a metallic bonding region at the interface between the coating layer 204 and the tacking film 202.

According to one embodiment, the tacking film 202 can have a particular thickness as compared to the average particle size of the abrasive particles 203. For example, the tacking film 202 can have an average thickness that is not greater than about 80% of the average particle size of the abrasive particles 203. In other abrasive articles, the tacking film 202 can have an average thickness of not greater than about 70%, such as not greater than about 60%, not greater than about 50%, not greater than about 40%, or even not greater than about 30% of the average particle size of the abrasive particles 203. Still, in certain instances the average thickness of the tacking film 202 can be at least about 3%, such as at least about 5%, at least about 8%, or even at least about 10% of the average particle size of the abrasive particles 203. It will be appreciated that the tacking film 202 can have an average thickness within a range between any of the minimum and maximum percentages noted above.

In alternative terms, according to certain abrasive articles, the tacking film 202 can have an average thickness that is not greater than about 25 microns. In still other embodiments, the tacking film 202 can have an average thickness that is not greater than about 20 microns, such as not greater than about 15 microns, not greater than about 12 microns, or even not greater than about 10 microns. In accordance with an embodiment, the tacking film 202 can have an average thickness that is at least about 0.05 microns, such as at least about 0.1 microns, at least about 0.5 micron, or even at least about 1 microns. It will be appreciated that the tacking film 202 can have an average thickness within a range between any of the minimum and maximum values noted above.

In certain aspects, depending on the size of the abrasive particles, the thickness of the tacking film 202 can affect the performance of the abrasive article. For example, for a particular particle size, if the tacking film 202 is too thin, the abrasive particles may not bond to the substrate 201. Further, if the tacking film 202 is too thick, the abrasive particles become too deeply embedded within the tacking film 202 and after the coating layer 204 is deposited over the abrasive particles 203 and the tacking film 202, the abrasive particles 202 do not substantially protrude from the substrate 201.

For nickel coated abrasive particles having an average particle size within a range of about 10-20 microns, the thickness of the tacking film can be at least about 1 micron. Further, the thickness can be at least about 1.25 microns, or at least about 1.75 microns. The thickness can be limited, however, such that the thickness is not greater than about 3.0 microns, not greater than about 2.75 microns, not greater than 2.5 microns, not greater than 2.25 microns, or not greater than 2.0 microns. For abrasive particles having an average particle size within a range of 10 and 20 microns, the tacking film 202 can have a thickness within a range between and including any of minimum and maximum thickness values noted above.

For nickel coated abrasive particles having an average particle size within a range of about 40-60 microns, the thickness of the tacking film can be at least about 1 micron. Further, the thickness can be at least about 1.25 microns, at least about 1.75 microns, at least about 2.0 microns, at least about 2.25 microns, at least about 2.5 microns, at least about 2.75 microns, or at least about 3.0 microns. The thickness can be limited, however, such that the thickness is not greater than about 5.0 microns, not greater than about 4.75 microns, not greater than 4.5 microns, not greater than about 4.25 microns, not greater than 4.0 microns, not greater than about 3.75 microns, not greater than 3.5 microns, not greater than 3.25 microns, or not greater than 3.0 microns. For abrasive particles having an average particle size within a range of 40 and 60 microns, the tacking film 202 can have a thickness within a range between and including any of minimum and maximum thickness values noted above.

As further illustrated, the bonding layer 205 can be directly overlying and directly bonded to the abrasive particles 203 and the tacking film 202. According to an embodiment, the bonding layer 205 can be formed to have a particular thickness. For example, the bonding layer 205 can have an average thickness of at least about 10% of the average particle size of the abrasive particles 203. In other embodiments, the average thickness of the bonding layer 205 can be greater, such as at least about 20%, at least about 30%, at least about 40%, or even at least about 50%. Still, the average thickness of the bonding layer 205 can be limited, such that it is not greater than about 130%, such as not greater than about 110%, not greater than about 100%, not greater than about 95%, or even not greater than about 90% of the average particle size of the abrasive particles 203. It will be appreciated that the bonding layer 205 can have an average thickness within a range between any of the minimum and maximum percentages noted above.

In more particular terms, the bonding layer 205 can be formed to have an average thickness that is at least 2 microns. For other abrasive articles, the bonding layer 205 can have a greater average thickness, such as at least about 5 microns, at least about 10 microns, at least about 15 microns, or even at least about 20 microns. Particular abrasive articles can have a bonding layer 205 having an average thickness that is not greater than about 100 microns, such as not greater than about 90 microns, not greater than about 80 microns, or not greater than about 70 microns. It will be appreciated that the bonding layer 205 can have an average thickness within a range between any of the minimum and maximum values noted above.

In a particular aspect, the abrasive article can include an abrasive grain concentration of at least about 60 particles per mm of wire. Further, the abrasive grain concentration can be at least about 100 particles per mm of wire, at least about 150 particles per mm of wire, at least about 200 particles per mm of wire, at least about 250 particles per mm of wire, or at least about 300 particles per mm of wire. In another aspect, the abrasive grain concentration may be no greater than about 750 particles per mm of wire, no greater than about 700 particles per mm of wire, no greater than about 650 particles per mm of wire, or no greater than about 600 particles per mm of wire. In another aspect, the abrasive particle concentration can be within a range between and including any of these abrasive concentration values.

In another aspect, the abrasive article can include an abrasive grain concentration of at least about 0.5 carats of diamond per kilometer of wire. Further, the abrasive grain concentration can be at least about 1.0 carats per kilometer of wire, at least about 1.5 carats per kilometer of wire, at least about 2.0 carats per kilometer of wire, at least about 3.0 carats per kilometer of wire, at least about 4.0 carats per kilometer of wire, or at least about 5.0 carats per kilometer of wire. The concentration, however, may be limited. For example, the concentration may not be greater than 15.0 carats per kilometer of wire, not greater than 14.0 carats per kilometer, not greater than 13.0 carats per kilometer, not greater than 12.0 carats per kilometer, not greater than 11.0 carats per kilometer, or not greater than 10.0 carats per kilometer. The concentration can be within a range between and including any of these minimum and maximum abrasive concentration values.

Example 1

A length of high strength carbon steel wire is obtained as a substrate. The high strength carbon steel wire has an average diameter of approximately 125 microns. A tacking film is formed on the external surface of the substrate via electroplating. The electroplating process forms a tacking film having an average thickness of approximately 4 microns. The tacking film is formed of a 60/40 tin/lead soldering composition.

After forming the tacking film, the wire is spooled into a bath containing a liquid flux material commercially available as Stay Clean® Liquid Soldering Flux from Harris Products Group and the treated wire is then sprayed with nickel-coated diamond abrasive particles having an average particle size of between 20 to 30 microns. Thereafter, the substrate, tacking film, and abrasive particles are heat treated to a temperature to approximately 190° C. The abrasive pre-form is then cooled and rinsed. The process of bonding the nickel coated diamond to the tacking film is conducted at an average spooling rate of 15 m/min.

Figure 3:
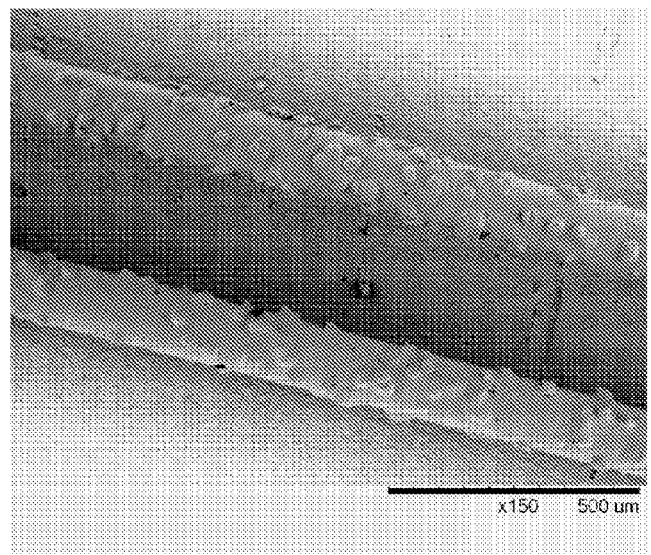
FIG. 3 includes a magnified image of an abrasive article formed according to an embodiment.

Thereafter, the abrasive pre-form is washed using 15% HCl followed by a rinse with de-ionized water. The rinsed article is electroplated with nickel to form a bonding layer directly contacting and overlying the abrasive particles and tacking film. FIG. 3 includes a magnified image of a portion of the abrasive article formed from the process of Example 1.

Example 2

A length of high strength carbon steel wire is obtained as a substrate. The high strength carbon steel wire has an average diameter of approximately 125 microns. A tacking film is formed on the external surface of the substrate via electroplating. The electroplating process forms a tacking film having an average thickness of approximately 6 microns. The tacking film is formed of a 60/40 tin/lead soldering composition.

After forming the tacking film, the wire is spooled into a bath containing a liquid flux material commercially available as Stay Clean® Liquid Soldering Flux from Harris Products Group and the treated wire is then sprayed with nickel-coated diamond abrasive particles having an average particle size of between 15 to 25 microns. Thereafter, the substrate, tacking film, and abrasive particles are heat treated to a temperature to approximately 190° C. The abrasive pre-form is then cooled and rinsed. The process of bonding the nickel coated diamond to the tacking film is conducted at an average spooling rate of 15 m/min.

Figure 4:
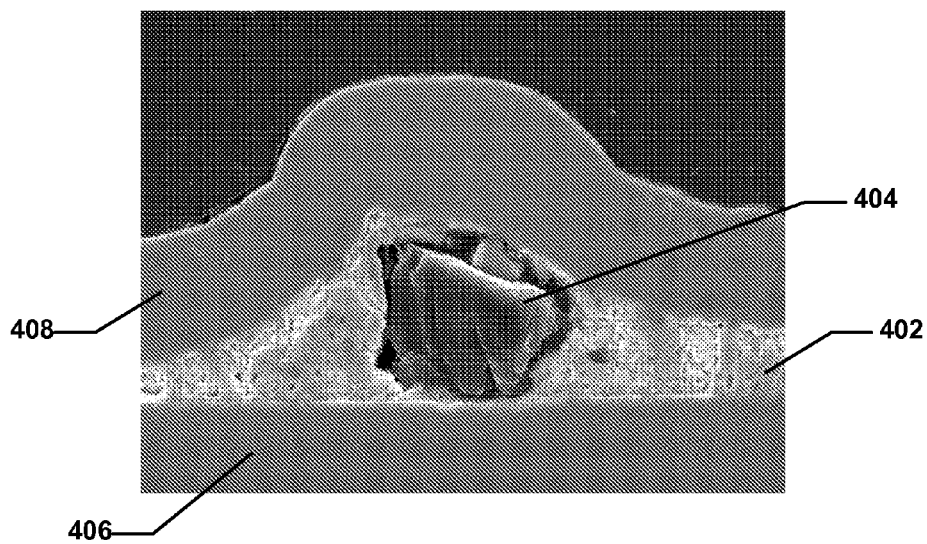
FIG. 4 includes a magnified image of an abrasive article formed according to another embodiment.

Thereafter, the abrasive pre-form is washed using 15% HCl followed by a rinse with de-ionized water. The rinsed article is electroplated with nickel to form a bonding layer directly contacting and overlying the abrasive particles and tacking film. FIG. 4 illustrates the resulting article. As indicated in FIG. 4, the tin/lead tacking film 402 having a thickness of approximately 6 microns allows the Ni coated diamond 404 to be relatively deeply embedded in the tacking film 402 on the wire 406. However, after the final layer of nickel 408 is electroplated onto the Ni coated diamond 404 and the tacking film 402, the Ni coated diamond 404 exhibits poor protrusion from the surface of the wire 406 and is not useful for cutting.

Example 3

A length of high strength carbon steel wire is obtained as a substrate. The high strength carbon steel wire has an average diameter of approximately 120 microns. A tacking film is formed on the external surface of the substrate via electroplating. The electroplating process forms a tacking film having an average thickness of approximately 2 microns. The tacking film is formed of a high purity tin soldering composition.

After forming the tacking film, the wire is spooled into a bath containing a liquid flux material commercially available as Stay Clean® Liquid Soldering Flux from Harris Products Group and the treated wire is then sprayed with nickel-coated diamond abrasive particles having an average particle size of between 10 to 20 microns. Thereafter, the substrate, tacking film, and abrasive particles are heat treated to a temperature to approximately 250° C. The abrasive pre-form is then cooled and rinsed. The process of bonding the nickel coated diamond to the tacking film is conducted at an average spooling rate of 15 m/min.

Thereafter, the abrasive pre-form is washed using 15% HCl followed by a rinse with de-ionized water. The rinsed article is electroplated with nickel to form a bonding layer directly contacting and overlying the abrasive particles and tacking film.

Example 4

A length of high strength carbon steel wire is obtained as a substrate. The high strength carbon steel wire has an average diameter of approximately 120 microns. A tacking film is formed on the external surface of the substrate via electroplating. The electroplating process forms a tacking film having an average thickness of approximately 2 microns. The tacking film is formed of a high purity tin soldering composition.

After forming the tacking film, the wire is spooled into a bath containing a liquid flux material commercially available as Stay Clean® Liquid Soldering Flux from Harris Products Group and nickel-coated diamond abrasive particles having an average particle size of between 10 to 20 microns are mixed with the flux. Thereafter, the substrate, tacking film, and abrasive particles are heat treated to a temperature to approximately 250° C. The abrasive pre-form is then cooled and rinsed. The process of bonding the nickel coated diamond to the tacking film is conducted at an average spooling rate of 15 m/min.

Thereafter, the abrasive pre-form is washed using 15% HCl followed by a rinse with de-ionized water. The rinsed article is electroplated with nickel to form a bonding layer directly contacting and overlying the abrasive particles and tacking film.

Figure 5:
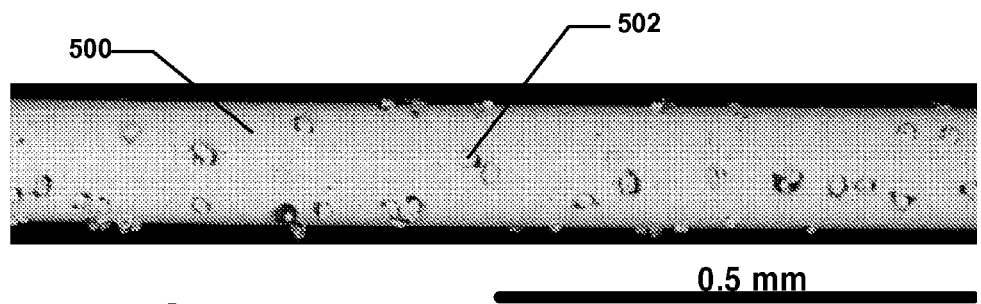
FIG. 5 includes a magnified image of an abrasive article formed according to another embodiment.
Figure 6:
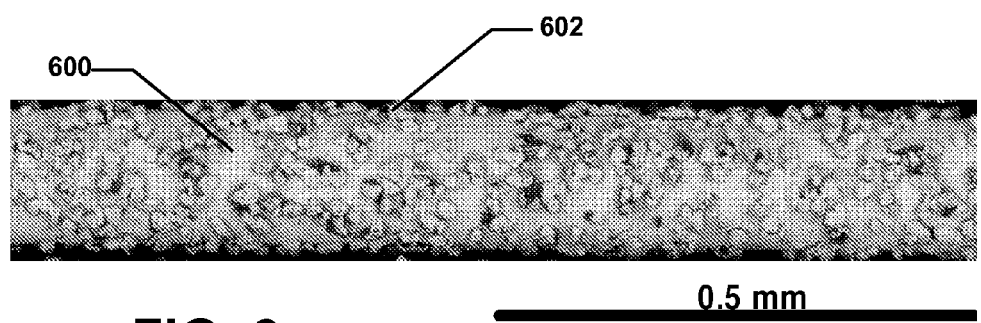
FIG. 6 includes a magnified image of an abrasive article formed according to yet another embodiment.

By controlling the concentration of nickel-coated diamond abrasive particles within the flux, diamond concentrations on the wire are obtained with a range that includes 60 particles per millimeter of wire and 600 particles per millimeter of wire. This corresponds to about 0.6 to 6.0 carats per kilometer of 120 micron steel wire. FIG. 5 depicts a wire 500 with a concentration of approximately 60 particles 502 per millimeter of wire and FIG. 6 depicts a wire 600 with a concentration of approximately 600 particles 602 per millimeter of wire. The particles 502, 602 on each of these wires 500, 600 are arranged in substantially single layer without any agglomeration or stacking (i.e., multiple layers).

Cutting Test

Twelve 100 mm square bricks of silicon are provided as workpieces. 365 meters of wire produced in accordance with EXAMPLE 4 is provided. The wire includes an abrasive particle concentration of about 1.0 carats per kilometer of wire. The wire includes a wire tension of approximately 14 Newtons and operates at a speed of 9 meters per second. The cutting time is 120 minutes. The wire successfully cut through the workpieces and produced 12 wafers with a single cut.

EDS Analysis

Figure 7:
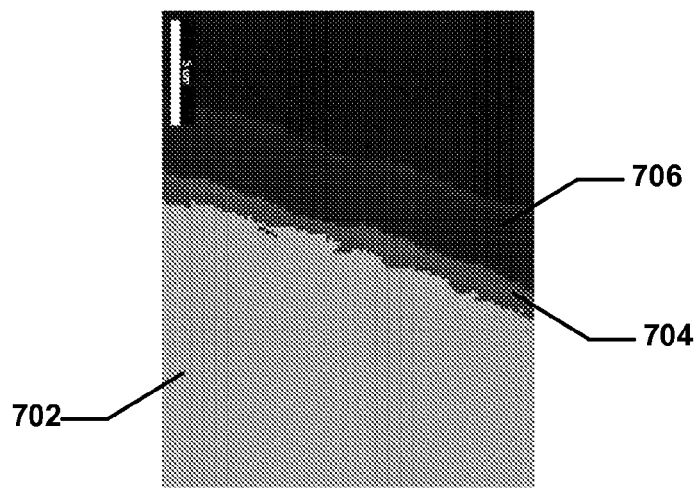
FIG. 7 includes a magnified image of an abrasive article formed according to still another embodiment.
Figure 8:
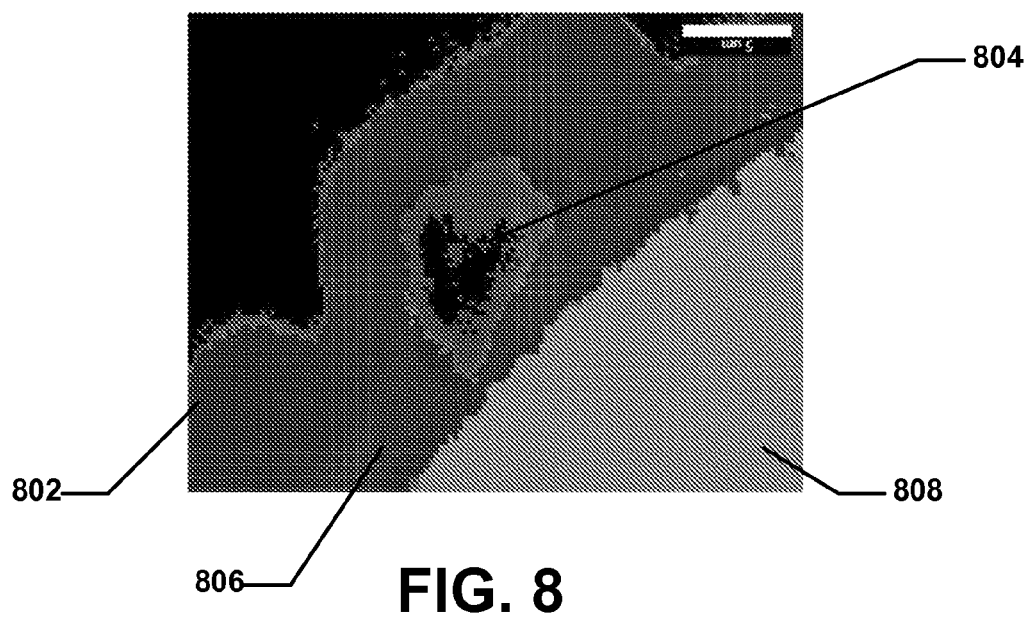
FIG. 8 includes a magnified image of an abrasive article formed according to another embodiment.

An EDS analysis of the wire of EXAMPLE 4 shows no indication of intermetallic compounds formed on the wire. Referring to FIG. 7, the results of the EDS analysis shows the steel wire 702 and a layer of tin 704 is disposed on the steel wire 702. Further, a layer of nickel is disposed on the tin 704. In FIG. 8, the results of the EDS analysis also indicates a nickel layer 802 is formed around the diamond 804 such that the diamond 804 is nearly completely coated with the nickel layer 802. Further, the nickel layer 802 forms an interface with the tin layer 806 that is deposited on the steel core 808.

Example 5

A length of high strength carbon steel wire is obtained as a substrate. The high strength carbon steel wire has an average diameter of approximately 120 microns. A tacking film is formed on the external surface of the substrate via dip coating. The dip coating process forms a tacking film having an average thickness of approximately 2 microns. The tacking film is formed of a high purity tin soldering composition.

After forming the tacking film, the wire is spooled into a bath containing a liquid flux material commercially available as Stay Clean® Liquid Soldering Flux from Harris Products Group and the treated wire is then sprayed with nickel-coated diamond abrasive particles having an average particle size of between 10 to 20 microns. Unfortunately, for reasons not quite understood, the abrasive particles do not adhere to the tacking film formed via dip coating and the remaining process steps are not performed.

Due to a lack of abrasive particles on the substrate, an abrasive article formed in a manner similar to EXAMPLE 5 would lack a usable amount of abrasive particles and the abrasive article would be untenable as an abrasive cutting tool.

The above-disclosed subject matter is to be considered illustrative, and not restrictive, and the appended claims are intended to cover all such modifications, enhancements, and other embodiments, which fall within the true scope of the present invention. Thus, to the maximum extent allowed by law, the scope of the present invention is to be determined by the broadest permissible interpretation of the following claims and their equivalents, and shall not be restricted or limited by the foregoing detailed description.

The Abstract of the Disclosure is provided to comply with Patent Law and is submitted with the understanding that it will not be used to interpret or limit the scope or meaning of the claims. In addition, in the foregoing Detailed Description of the Drawings, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all features of any of the disclosed embodiments. Thus, the following claims are incorporated into the Detailed Description of the Drawings, with each claim standing on its own as defining separately claimed subject matter.

What is claimed is:

1. An abrasive article for cutting a workpiece formed by a process comprising:
   providing a wire substrate;
   forming a tacking film comprising a metal material overlying a surface of the wire substrate;
   placing abrasive particles in the tacking film;
   treating the tacking film to form a metallic bonding region between the abrasive particles and the tacking film, wherein the tacking film comprises an average thickness of at least about 10% and not greater than about 30% of an average particle size of the abrasive particles and wherein the tacking film comprises an electroplated layer; and
   forming a bonding layer over the tacking film and the abrasive particles.

2. The abrasive article of claim 1, wherein the substrate comprises an inorganic material.

3. The abrasive article of claim 2, wherein the substrate comprises steel.

4. The abrasive article of claim 1, wherein the substrate comprises an average width of at least about 0.03 mm and not greater than about 1 cm.

5. The abrasive article of claim 1, wherein the tacking film comprises an average thickness of not greater than about 80% of an average particle size of the abrasive particles.

6. The abrasive article of claim 1, wherein the metallic bonding region comprises a diffusion bond region characterized by a region of interdiffusion between at least one chemical species of a coating layer overlying the abrasive particles and one chemical species of the tacking film.

7. An abrasive article for cutting a workpiece formed by a process comprising:
   providing a wire substrate;
   forming a tacking film comprising a metal material overlying a surface of the wire substrate;
   applying a flux material to the tacking film, wherein the flux material comprises abrasive particles mixed therein;
   treating the tacking film to form a metallic bonding region between the abrasive particles and the tacking film, wherein the tacking film comprises an average thickness of at least about 10% and not greater than about 30% of an average particle size of the abrasive particles and wherein the tacking film comprises an average thickness of at least about 0.1 microns and not greater than about 4 microns; and
   forming a bonding layer over the tacking film and the abrasive particles.

8. The abrasive article of claim 7, wherein the abrasive particles comprise an average particle size of at least about 0.1 microns and not greater than about 500 microns.

9. The abrasive article of claim 7, wherein the abrasive particles comprise a superabrasive material.

10. The abrasive article of claim 7, wherein an average thickness of the bonding layer is at least about 2 microns and not greater than about 100 microns.

11. The abrasive article of claim 7, wherein the tacking film has a melting point of not greater than about 250° C.

12. The abrasive article of claim 7, wherein the tacking film comprises a metal alloy of tin and lead.

13. The abrasive article of claim 7, wherein the substrate comprises a plurality of filaments braided together.

14. The abrasive article of claim 7, wherein the substrate includes a wire and an abrasive grain concentration of the abrasive article is at least about 60 particles per mm of wire and not greater than about 750 particles per mm of wire.

15. The abrasive article of claim 7, wherein forming the tacking film comprises a method selected from the group consisting of deposition, spraying, printing, dipping, die coating, electroplating, and a combination thereof.

16. The abrasive article of claim 7, wherein the tacking film is bonded to the substrate at a bonding region defined by interdiffusion of elements of the tacking film and the substrate.

17. The abrasive article of claim 7, wherein the tacking film comprises a material selected from the group of materials consisting of metal, metal alloys, metal matrix composites, and a combination thereof.

18. The abrasive article of claim 7, wherein the tacking film comprises a metal alloy of tin and lead.

19. The abrasive article of claim 7, wherein the tacking film has a melting point of not greater than about 450° C.

* * * * *